United States Patent
Giura

(10) Patent No.: US 11,212,161 B2
(45) Date of Patent: Dec. 28, 2021

(54) MANAGEMENT AND RESOLUTION OF ALARMS BASED ON HISTORICAL ALARMS

(71) Applicant: AT&T Intellectual Property I, L.P., Atlanta, GA (US)

(72) Inventor: Paul Giura, Cohoes, NY (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 0 days.

(21) Appl. No.: 16/872,015

(22) Filed: May 11, 2020

(65) Prior Publication Data
US 2021/0351974 A1 Nov. 11, 2021

(51) Int. Cl.
*H04L 12/24* (2006.01)
*H04L 9/06* (2006.01)
*H04L 12/26* (2006.01)

(52) U.S. Cl.
CPC ........ *H04L 41/0631* (2013.01); *H04L 9/0643* (2013.01); *H04L 41/0613* (2013.01); *H04L 41/0627* (2013.01); *H04L 43/0817* (2013.01)

(58) Field of Classification Search
CPC .............. H04L 41/0631; H04L 9/0643; H04L 41/0613; H04L 41/0627; H04L 43/0817
USPC ....................................................... 709/224
See application file for complete search history.

(56) References Cited

U.S. PATENT DOCUMENTS

| 8,005,914 | B2* | 8/2011 | Han | H04L 41/0686 |
| | | | | 709/207 |
| 8,965,817 | B1* | 2/2015 | Forrester | G06N 20/00 |
| | | | | 706/14 |
| 9,253,029 | B2* | 2/2016 | Ishikawa | H04L 41/069 |
| 9,865,158 | B2* | 1/2018 | Kang | G08B 29/185 |
| 10,785,769 | B2* | 9/2020 | Hwang | H04L 1/0041 |
| 10,834,117 | B2* | 11/2020 | Mikulski | H04L 9/088 |
| 2017/0053520 | A1* | 2/2017 | Cook | G08B 25/008 |
| 2019/0342430 | A1* | 11/2019 | Cook | H04L 12/28 |
| 2020/0334093 | A1* | 10/2020 | Dubey | G06F 11/0778 |
| 2021/0006453 | A1* | 1/2021 | Dutta | H04L 41/065 |
| 2021/0021456 | A1* | 1/2021 | Qi | H04L 41/069 |

OTHER PUBLICATIONS

Giura et al., Is It Really You? User Identification Via Adaptive Behavior Fingerprinting, CODASPY '14: Proceedings of the 4TH ACM Conference on Data and Application Security and Privacy, 333-344 (2014). (Year: 2014).*

* cited by examiner

*Primary Examiner* — David P Zarka

(57) ABSTRACT

The present disclosure describes methods, computer-readable media, and apparatuses supporting management and resolution of alarms of a communication network. In one example, management and resolution may include receiving a new alarm, determining an alarm resolution of the new alarm based on the new alarm and historical alarm information, and initiating an alarm resolution action for resolving the new alarm based on the alarm resolution of the new alarm. In one example, management and resolution may include maintaining historical alarm information for a set of historical alarms, receiving a new alarm, determining a set of similar alarms including one or more of the historical alarms similar to the new alarm, determining an alarm resolution for the new alarm based on the set of similar alarms similar to the new alarm, and initiating an alarm resolution action for resolving the new alarm based on the alarm resolution of the new alarm.

20 Claims, 5 Drawing Sheets

MANAGEMENT AND RESOLUTION OF ALARMS BASED ON HISTORICAL ALARMS

The present disclosure relates generally to communication systems, and more particularly to methods, computer-readable media, and apparatuses for supporting management and resolution of alarms in communication systems.

BACKGROUND

The operation of communication networks by communication network providers often results in generation of various types of alarms which need to be analyzed and resolved by the communication network providers. For example, the operation of communication networks may result in alarms such as device alarms, security alarms, and the like. As communication networks, and the numbers of devices and applications supported by the communication networks, continues to grow, the number of alarms generated also continues to grow. Without improved handling of alarms, this may result in cost increases, delays in alarm handling times, and so forth. Accordingly, as the number of alarms continues to grow, communication network providers continue to seek ways to support improved handling of alarms.

SUMMARY

In one example, the present disclosure describes methods, computer-readable media, and apparatuses for supporting management and resolution of alarms of a communication network.

In one example, a method is performed by a processing system including at least one processor. The method includes receiving, by the processing system, a set of alarm features of a first alarm. The method includes generating, by the processing system based on the set of alarm features of the first alarm, an alarm fingerprint of the first alarm. The method includes obtaining, by the processing system for a set of historical alarms, a set of historical alarm information including, for each of the historical alarms in the set of historical alarms, a respective alarm fingerprint of the historical alarm and a respective alarm resolution of the historical alarm. The method includes determining, by the processing system based on the alarm fingerprint of the first alarm and the respective alarm fingerprints of the historical alarms, a set of similar alarms including one or more of the historical alarms determined to be similar to the first alarm, wherein the determining of the set of similar alarms includes comparing the alarm fingerprint of the first alarm with the respective alarm fingerprints of the historical alarms, based on a similarity metric, to obtain a respective set of similarity values associated with the respective historical alarms. The method includes determining, by the processing system based on one or more similarity values of respective one or more historical alarms in the set of similar alarms and respective one or more alarm resolutions of the respective one or more historical alarms in the set of similar alarms, an alarm resolution of the first alarm. The method includes initiating, by the processing system based on the alarm resolution of the first alarm, an alarm resolution action configured to resolve the first alarm.

In one example, a computer-readable medium stores instructions which, when executed by a processing system, cause the processing system to perform operations. The operations include receiving a set of alarm features of a first alarm. The operations include generating, based on the set of alarm features of the first alarm, an alarm fingerprint of the first alarm. The operations include obtaining, for a set of historical alarms, a set of historical alarm information including, for each of the historical alarms in the set of historical alarms, a respective alarm fingerprint of the historical alarm and a respective alarm resolution of the historical alarm. The operations include determining, based on the alarm fingerprint of the first alarm and the respective alarm fingerprints of the historical alarms, a set of similar alarms including one or more of the historical alarms determined to be similar to the first alarm, wherein the determining of the set of similar alarms includes comparing the alarm fingerprint of the first alarm with the respective alarm fingerprints of the historical alarms, based on a similarity metric, to obtain a respective set of similarity values associated with the respective historical alarms. The operations include determining, based on one or more similarity values of respective one or more historical alarms in the set of similar alarms and respective one or more alarm resolutions of the respective one or more historical alarms in the set of similar alarms, an alarm resolution of the first alarm. The operations include initiating, based on the alarm resolution of the first alarm, an alarm resolution action configured to resolve the first alarm.

In one example, an apparatus includes a processing system including at least one processor and a computer-readable medium storing instructions which, when executed by the processing system, cause the processing system to perform operations. The operations include receiving a set of alarm features of a first alarm. The operations include generating, based on the set of alarm features of the first alarm, an alarm fingerprint of the first alarm. The operations include obtaining, for a set of historical alarms, a set of historical alarm information including, for each of the historical alarms in the set of historical alarms, a respective alarm fingerprint of the historical alarm and a respective alarm resolution of the historical alarm. The operations include determining, based on the alarm fingerprint of the first alarm and the respective alarm fingerprints of the historical alarms, a set of similar alarms including one or more of the historical alarms determined to be similar to the first alarm, wherein the determining of the set of similar alarms includes comparing the alarm fingerprint of the first alarm with the respective alarm fingerprints of the historical alarms, based on a similarity metric, to obtain a respective set of similarity values associated with the respective historical alarms. The operations include determining, based on one or more similarity values of respective one or more historical alarms in the set of similar alarms and respective one or more alarm resolutions of the respective one or more historical alarms in the set of similar alarms, an alarm resolution of the first alarm. The operations include initiating, based on the alarm resolution of the first alarm, an alarm resolution action configured to resolve the first alarm.

In one example, a method is performed by a processing system including at least one processor. The method includes receiving, by a processing system of a first communication network, a set of alarm features of a first alarm. The method includes determining, by the processing system based on the set of alarm features of the first alarm, an alarm fingerprint of the first alarm. The method includes encoding, by the processing system, the alarm fingerprint of the first alarm to form an encoded alarm fingerprint of the first alarm. The method includes sending, by the processing system toward a second communication network, a query including the encoded alarm fingerprint of the first alarm. The method includes receiving, by the processing system from the second communication network, a query response including a set of similar encoded alarm fingerprints associated with a respective set of alarms of the second communication network, wherein the similar encoded alarm fingerprints in the set of similar encoded alarm fingerprints are identified as being similar to the encoded alarm fingerprint of the first alarm based on a similarity metric configured to determine similarity between encoded data structures. The method includes determining, by the processing system based on an analysis of the set of similar encoded alarm fingerprints, a management action related to the first alarm. The method includes initiating, by the processing system, the management action related to the first alarm.

In one example, a computer-readable medium stores instructions which, when executed by a processing system, cause the processing system to perform operations. The operations include receiving, by a processing system of a first communication network, a set of alarm features of a first alarm. The operations include determining, by the processing system based on the set of alarm features of the first alarm, an alarm fingerprint of the first alarm. The operations include encoding, by the processing system, the alarm fingerprint of the first alarm to form an encoded alarm fingerprint of the first alarm. The operations include sending, by the processing system toward a second communication network, a query including the encoded alarm fingerprint of the first alarm. The operations include receiving, by the processing system from the second communication network, a query response including a set of similar encoded alarm fingerprints associated with a respective set of alarms of the second communication network, wherein the similar encoded alarm fingerprints in the set of similar encoded alarm fingerprints are identified as being similar to the encoded alarm fingerprint of the first alarm based on a similarity metric configured to determine similarity between encoded data structures. The operations include determining, by the processing system based on an analysis of the set of similar encoded alarm fingerprints, a management action related to the first alarm. The operations include initiating, by the processing system, the management action related to the first alarm.

In one example, an apparatus includes a processing system including at least one processor and a computer-readable medium storing instructions which, when executed by the processing system, cause the processing system to perform operations. The operations include receiving, by a processing system of a first communication network, a set of alarm features of a first alarm. The operations include determining, by the processing system based on the set of alarm features of the first alarm, an alarm fingerprint of the first alarm. The operations include encoding, by the processing system, the alarm fingerprint of the first alarm to form an encoded alarm fingerprint of the first alarm. The operations include sending, by the processing system toward a second communication network, a query including the encoded alarm fingerprint of the first alarm. The operations include receiving, by the processing system from the second communication network, a query response including a set of similar encoded alarm fingerprints associated with a respective set of alarms of the second communication network, wherein the similar encoded alarm fingerprints in the set of similar encoded alarm fingerprints are identified as being similar to the encoded alarm fingerprint of the first alarm based on a similarity metric configured to determine similarity between encoded data structures. The operations include determining, by the processing system based on an analysis of the set of similar encoded alarm fingerprints, a management action related to the first alarm. The operations include initiating, by the processing system, the management action related to the first alarm.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one example, the present disclosure describes methods, computer-readable media, and apparatuses for supporting management and resolution of alarms of a communication network. In one example, management and resolution of alarms of a communication network may include receiving a new alarm, determining an alarm resolution of the new alarm based on the new alarm and historical alarm information of historical alarms, and initiating an alarm resolution action for resolving the new alarm based on the alarm resolution of the new alarm. In one example, management and resolution of alarms of a communication network may include maintaining a set of historical alarms (e.g., alarm features, alarm fingerprints representing alarm features, alarm resolutions, and the like), receiving a new alarm (e.g., including alarm features, having alarm features associated therewith, and the like), determining a set of similar alarms including one or more of the historical alarms determined to be similar to the new alarm (e.g., based on comparison of an alarm fingerprint of the new alarm to alarm fingerprints of historical alarms based on a similarity metric), determining an alarm resolution for the new alarm based on the set of similar alarms similar to the new alarm (e.g., based on similarity values (or scores) indicative of similarity of the new alarm to ones of the similar alarms in the set of similar alarms, alarm resolutions of ones of the similar alarms in the set of similar alarms, and the like), and initiating an alarm resolution action for resolving the new alarm based on the alarm resolution of the new alarm (e.g., a blocking action, a configuration action, a notification action, and the like). In one example, management and resolution of alarms of a communication network may include providing encoded alarm information to one or more third party entities (e.g., one or more customers of the communication network provider of the communication network), which may include pushing encoded alarm fingerprints, providing encoded alarm fingerprints in response to queries, and the like. It will be appreciated that management and resolution of alarms of a communication network may be performed for various types of alarms which may be associated with a communication network (e.g., device alarms, network alarms, service alarms, security alarms, and the like). These and other aspects of the present disclosure for supporting management and resolution of alarms are discussed in greater detail below in connection with the examples of FIGS. 1-5.

Figure 1:
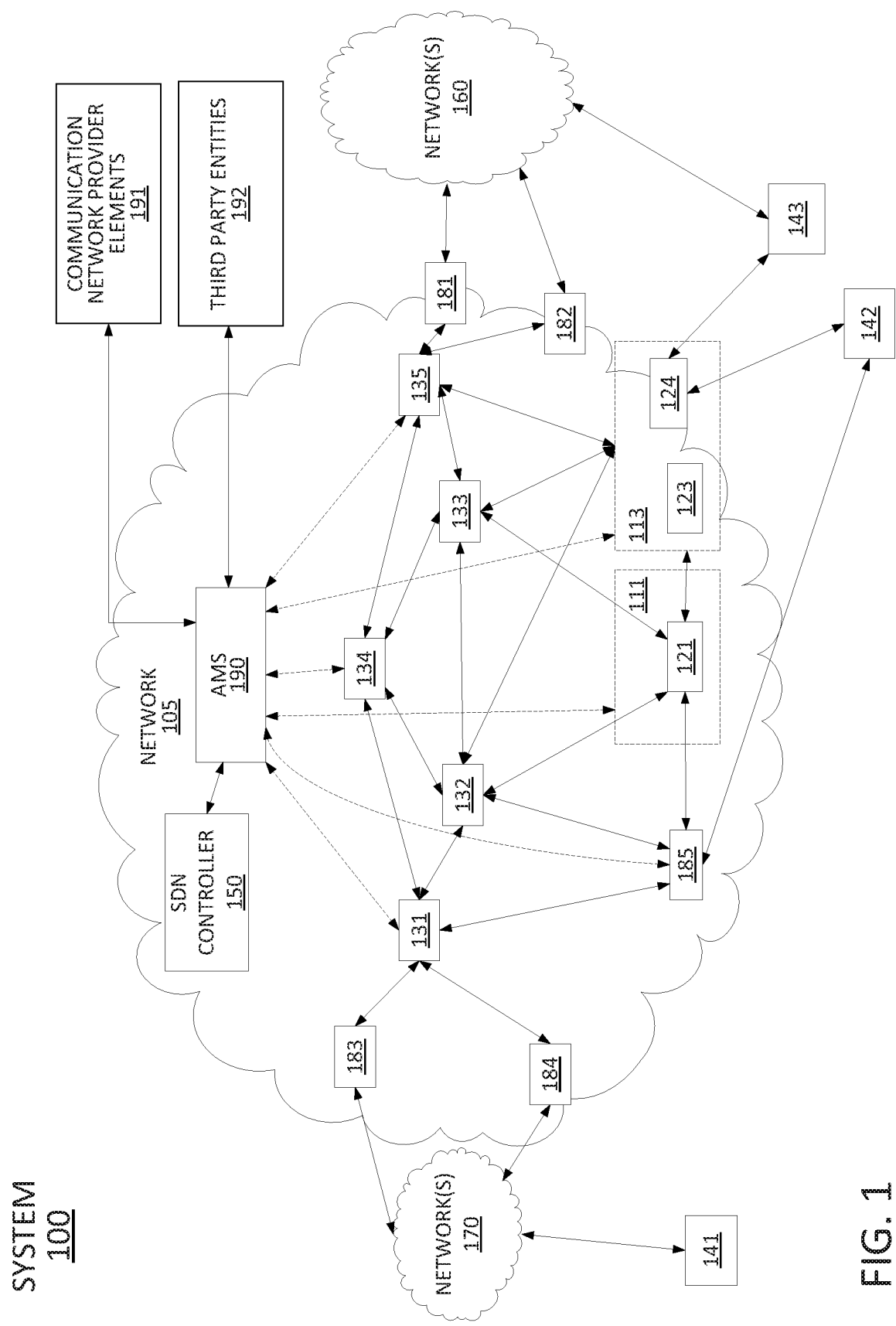
FIG. 1 illustrates an example system configured to support management and resolution of alarms of a communication network.

FIG. 1 illustrates an example system configured to support management and resolution of alarms of a communication network. The system 100 may include any number of interconnected networks which may use the same or different communication technologies. As illustrated in FIG. 1, system 100 may include a network 105, e.g., a telecommunication network.

In one example, the network 105 may include a backbone network, or transport network, such as an Internet Protocol (IP)/multi-protocol label switching (MPLS) network, where label switched paths (LSPs) can be assigned for routing Transmission Control Protocol (TCP)/IP packets, User Datagram Protocol (UDP)/IP packets, and other types of protocol data units (PDUs) (broadly "traffic"). However, it will be appreciated that the present disclosure is equally applicable to other types of data units and network protocols. For instance, the network 105 may alternatively or additionally include components of a cellular core network, such as a Public Land Mobile Network (PLMN), a General Packet Radio Service (GPRS) core network, and/or an evolved packet core (EPC) network, an Internet Protocol Multimedia Subsystem (IMS) network, a Voice over Internet Protocol (VoIP) network, and so forth. In one example, the network 105 uses a network function virtualization infrastructure (NFVI), e.g., servers in a data center or data centers that are available as host devices to host virtual machines (VMs) including virtual network functions (VNFs). In other words, at least a portion of the network 105 may incorporate software-defined network (SDN) components. In this regard, it should be noted that, as referred to herein, "traffic" may include all or a portion of a transmission, e.g., a sequence or flow, including one or more packets, segments, datagrams, frames, cells, PDUs, service data unit, bursts, and so forth. The particular terminology or types of data units involved may vary depending upon the underlying network technology. Thus, the term "traffic" is intended to refer to any quantity of data to be sent from a source to a destination through one or more networks.

In one example, the network 105 may be in communication with networks 160 and networks 170. Networks 160 and 170 may each include a wireless network (e.g., an Institute of Electrical and Electronics Engineers (IEEE) 802.11/Wi-Fi network and the like), a cellular access network (e.g., a Universal Terrestrial Radio Access Network (UTRAN) or an evolved UTRAN (eUTRAN), and the like), a circuit switched network (e.g., a public switched telephone network (PSTN)), a cable network, a digital subscriber line (DSL) network, a metropolitan area network (MAN), an Internet service provider (ISP) network, a peer network, and the like. In one example, the networks 160 and 170 may include different types of networks. In another example, the networks 160 and 170 may be the same type of network. The networks 160 and 170 may be controlled or operated by a same entity as that of network 105 or may be controlled or operated by one or more different entities. In one example, the networks 160 and 170 may include separate domains, e.g., separate routing domains from the network 105. In one example, networks 160 and/or networks 170 may represent the Internet in general.

In one example, network 105 may transport traffic to and from user devices 141-143. For instance, the traffic may relate to communications such as voice telephone calls, video and other multimedia, text messaging, emails, and so forth among the user devices 141-143, or between the user devices 141-143 and other devices that may be accessible via networks 160 and 170. For instance, the traffic may relate to management actions performed on the network 105 (e.g., management actions such as create/update/delete (CRUD) operations, queries, and so forth). User devices 141-143 may include, for example, cellular telephones, smart phones, personal computers, other wireless and wired computing devices, private branch exchanges, customer edge (CE) routers, media terminal adapters, cable boxes, home gateways and/or routers, and so forth.

In one example, user devices 141-143 may communicate with or may communicate via network 105 in various ways. For example, user device 141 may include a cellular telephone which may connect to network 105 via network 170, e.g., a cellular access network. For instance, such an example network 170 may include one or more cell sites, e.g., including a base transceiver station (BTS), a NodeB, an evolved NodeB (eNodeB), or the like (broadly a "base station"), a remote radio head (RRH) and baseband unit, a base station controller (BSC) or radio network controller (RNC), and so forth. In addition, in such an example, components 183 and 184 in network 105 may include a serving gateway (SGW), a mobility management entity (MME), or the like. In one example, user device 142 may include a customer edge (CE) router which may provide access to network 105 for additional user devices (not shown) which may be connected to the CE router. For instance, in such an example, component 185 may include a provider edge (PE) router.

In one example, various components of network 105 may include virtual network functions (VNFs) which may physically include hardware executing computer-readable/computer-executable instructions, code, and/or programs to perform various functions. As illustrated in FIG. 1, units 123 and 124 may reside on a network function virtualization infrastructure (NFVI) 113, which is configurable to perform a broad variety of network functions and services. For example, NFVI 113 may include shared hardware, e.g., one or more host devices including line cards, central processing units (CPUs), or processors, memories to hold computer-readable/computer-executable instructions, code, and/or programs, and so forth. For instance, in one example unit 123 may be configured to be a firewall, a media server, a Simple Network Management protocol (SNMP) trap, etc., and unit 124 may be configured to be a PE router, e.g., a virtual provide edge (VPE) router, which may provide connectivity to network 105 for user devices 142 and 143. In one example, NFVI 113 may represent a single computing device. Accordingly, units 123 and 124 may physically reside on the same host device. In another example, NFVI 113 may represent multiple host devices such that units 123 and 124 may reside on different host devices. In one example, unit 123 and/or unit 124 may have functions that are distributed over a plurality of host devices. For instance, unit 123 and/or unit 124 may be instantiated and arranged (e.g., configured/programmed via computer-readable/computer-executable instructions, code, and/or programs) to provide for load balancing between two processors and several line cards that may reside on separate host devices.

In one example, network 105 may also include an additional NFVI 111. For instance, unit 121 may be hosted on NFVI 111, which may include host devices having the same or similar physical components as NFVI 113. In addition, NFVI 111 may reside in a same location or in different locations from NFVI 113. As illustrated in FIG. 1, unit 121 may be configured to perform functions of an internal component of network 105. For instance, due to the connections available to NFVI 111, unit 121 may not function as a PE router, a SGW, a MME, a firewall, etc. Instead, unit 121 may be configured to provide functions of components that do not utilize direct connections to components external to network 105, such as a call control element (CCE), a media server (MS), a domain name service (DNS) server, a packet data network (PDN) gateway (PGW), a gateway mobile switching center (GMSC), a short message service center (SMSC), and the like.

In one example, network 105 includes a software defined network (SDN) controller 150. In one example, the SDN controller 150 may include a computing device or processing system (e.g., a server), such as computing system 500 depicted in FIG. 5, and may be configured to provide one or more operations or functions in connection with examples of the present disclosure for supporting management and resolution of alarms of a communication network.

In one example, NFVI 111 and unit 121, and NFVI 113 and units 123 and 124 may be controlled and managed by the SDN controller 150. For instance, in one example, SDN controller 150 is responsible for such functions as provisioning and releasing instantiations of VNFs to perform the functions of routers, switches, and other devices, provisioning routing tables and other operating parameters for the VNFs, and so forth. In one example, SDN controller 150 may maintain communications with VNFs and/or host devices/NFVI via a number of control links which may include secure tunnels for signaling communications over an underling IP infrastructure of network 105. In other words, the control links may include virtual links multiplexed with transmission traffic and other data traversing network 105 and carried over a shared set of physical links. For ease of illustration the control links are omitted from FIG. 1. In one example, the SDN controller 150 also may include a virtual machine operating on NFVI/host device(s), or may include a dedicated device. For instance, SDN controller 150 may be collocated with one or more VNFs, or may be deployed in a different host device or at a different physical location.

In one example, the functions of SDN controller 150 may include the selection of NFVI from among various NFVI available in network 105 (e.g., NFVI 111 or 113) to host various devices (e.g., routers, gateways, switches, and the like) and the instantiation of such devices. For example, with respect to units 123 and 124, SDN controller 150 may download computer-executable/computer-readable instructions, code, and/or programs (broadly "configuration code") for units 123 and 124 respectively, which when executed by a processor of the NFVI 113, may cause the NFVI 113 to perform as a PE router, a gateway, a route reflector, a SGW, a MME, a firewall, a media server, a DNS server, a PGW, a GMSC, a SMSC, a CCE, and so forth. In one example, SDN controller 150 may download the configuration code to the NFVI 113. In another example, SDN controller 150 may instruct the NFVI 113 to load the configuration code previously stored on NFVI 113 and/or to retrieve the configuration code from another device in network 105 that may store the configuration code for one or more VNFs. The functions of SDN controller 150 may also include releasing or decommissioning unit 123 and/or unit 124 when no longer required, the transferring of the functions of units 123 and/or 124 to different NFVI, e.g., when NFVI 113 is taken offline, and so on.

In one example, SDN controller 150 may represent a processing system including a plurality of controllers, e.g., a multi-layer SDN controller, one or more federated layer-0/physical layer SDN controllers, and so forth. For instance, a multi-layer SDN controller may be responsible for instantiating, tearing down, configuring, reconfiguring, and/or managing layer-2 and/or layer-3 VNFs (e.g., a network switch, a layer-3 switch and/or a router, and the like), whereas one or more layer-0 SDN controllers may be responsible for activating and deactivating optical networking components, for configuring and reconfiguring the optical networking components (e.g., to provide circuits/wavelength connections between various nodes or to be placed in idle mode), for receiving management and configuration information from such devices, and so forth. In one example, the layer-0 SDN controller(s) may in turn be controlled by the multi-layer SDN controller. For instance, each layer-0 SDN controller may be assigned to nodes/optical components within a portion of the network 105. In addition, these various components may be co-located or distributed among a plurality of different dedicated computing devices or shared computing devices (e.g., NFVI) as described herein.

In one example, the network 105 may also include internal nodes 131-135, which may include various components, such as routers, switches, route reflectors, and the like, cellular core network, IMS network, and/or VoIP network components, and so forth. In one example, these internal nodes 131-135 also may include VNFs hosted by and operating on additional NFVIs. For instance, as illustrated in FIG. 1, internal nodes 131 and 135 may include VNFs residing on additional NFVI (not shown) that are controlled by SDN controller 150 via additional control links. However, at least a portion of the internal nodes 131-135 may include dedicated devices or components, e.g., non-SDN reconfigurable devices.

In one example, the network 105 may also include components 181 and 182, e.g., PE routers interfacing with networks 160, and component 185, e.g., a PE router which may interface with user device 142. For instance, in one example, network 105 may be configured such that user device 142 (e.g., a CE router) is dual-homed. In other words, user device 142 may access network 105 via either or both of unit 124 and component 185. As mentioned above, components 183 and 184 may include a serving gateway (SGW), a mobility management entity (MME), or the like. However, in another example, components 183 and 184 also may include PE routers interfacing with network(s) 170, e.g., for non-cellular network-based communications. In one example, components 181-185 also may include VNFs hosted by and operating on additional NFVI. However, in another example, at least a portion of the components 181-185 may include dedicated devices or components.

In one example, the network 105 includes an alarm management system (AMS) 190 configured to support management and resolution of alarms related to the network 105. In one example, the AMS 190 may be configured to perform alarm management and resolution functions for alarms related to the network 105. The AMS 190 may receive alarms related to the network 105, analyze the alarms related to the network 105 to determine similarity to historical alarms related to the network 105, determine alarm resolutions for the alarms related to the network 105 based on similarity to historical alarms related to the network 105, and initiate alarm resolution actions for resolving the alarms related to the network 105 based on the alarm resolutions for the alarms related to the network 105. The AMS 190 also may be configured to, within the context of performing various alarm management and resolution functions, provide alarm management information (e.g., alarms, alarm analysis results, alarm resolutions, and the like) to various elements and entities which, as illustrated in FIG. 1, may include communication network provider elements 191 and/or third party entities 192. The operation of AMS 190 in performing such functions is discussed further within the context of FIG. 1 and may be further understood by way of reference to the example process of FIG. 2 and the example methods of FIG. 3 and FIG. 4.

The AMS 190 may be configured to receive alarms related to the network 105. The network 105 supports various communications and services, and various problems associated with support for such communications and services may result in generation of various network element alarms or network service alarms which may be provided to the AMS 190. The network 105 may face various types of attacks which may be directed against the network 105, and the detection of such attacks may result in generation of various security alarms which may be provided to the AMS 190. The AMS 190 may receive various other types of alarms related to the network 105. The AMS 190 may receive the alarms from elements of the network 105 (e.g., AMS 190 is depicted as being in communication with various elements of the network 105 and may receive alarms from various elements of the network 105), elements included within or otherwise associated with the network 105 (e.g., element management systems, network management systems, service management systems, security management systems, and the like, which have been omitted for purposes of clarity), and so forth. It will be appreciated that the AMS 105 may receive various other types of alarms, may receive alarms from various other sources of alarms, and so forth.

The AMS 190 may be configured to analyze the alarms related to the network 105 to determine similarity to historical alarms related to the network 105. The AMS 190 may analyze the alarms related to the network 105, to determine similarity to historical alarms related to the network 105, based on use of one or more similarity metrics which may be used to evaluate similarity between alarm features of alarms (e.g., using one or more distance-based metrics).

The AMS 190 may be configured to determine alarm resolutions for the alarms related to the network 105 based on similarity to historical alarms related to the network 105. The AMS 190 may determine alarm resolutions for the alarms related to the network 105 based on historical alarm information of historical alarms related to the network 105 which are identified as being similar to the alarms related to the network 105 (e.g., based on use of past resolutions used for similar alarms within the network 105).

The AMS 190 may be configured to initiate alarm resolution actions via the network 105 for resolving the alarms related to the network 105 based on the alarm resolutions for the alarms related to the network 105. The AMS 190 may initiate alarm resolution actions such as blocking an end device, reconfiguring a network element of the network 105, sending a notification related to a device, and the like.

The AMS 190, as indicated above, may be configured to provide alarm management information (e.g., alarms, alarm fingerprints, alarm resolutions, alarm analysis results, and the like) to various communication network provider elements 191. The communication network provider elements 191 may be elements of the communication network provider which operates the network 105. For example, the communication network provider elements 191 may include one or more network elements, one or more management systems (e.g., element management systems, network management systems, and the like), one or more network operations center (NOC) systems or devices (e.g., for review, analysis, and resolution by automated alarm analysis functions, human alarm analysts, and the like), and so forth. It will be appreciated that the communication network provider elements 191 may include various other elements of the communication network provider which may be involved in alarm management and resolution for the communication network provider.

The AMS 190, as indicated above, may be configured to provide alarm-related information to various third party entities 192. The third party entities 192 may be entities which are not entities of the communication network provider, but which may be affiliated with the communication network provider (e.g., enterprise customers or other entities). For example, the third party entities 192 may include one or more network elements, one or more management systems, one or more service operations center (SOC) systems or devices, and so forth. It will be appreciated that the alarm management information will be encoded before being provided to the third party entities 192, thereby protecting information under the control of the communication network provider (e.g., private information of the communication network provider, personal information of customers of the communication network provider, and the like) while also enabling third party entities to obtain and use alarm management information (e.g., for trend analysis, network management, or other purposes).

Figure 5:
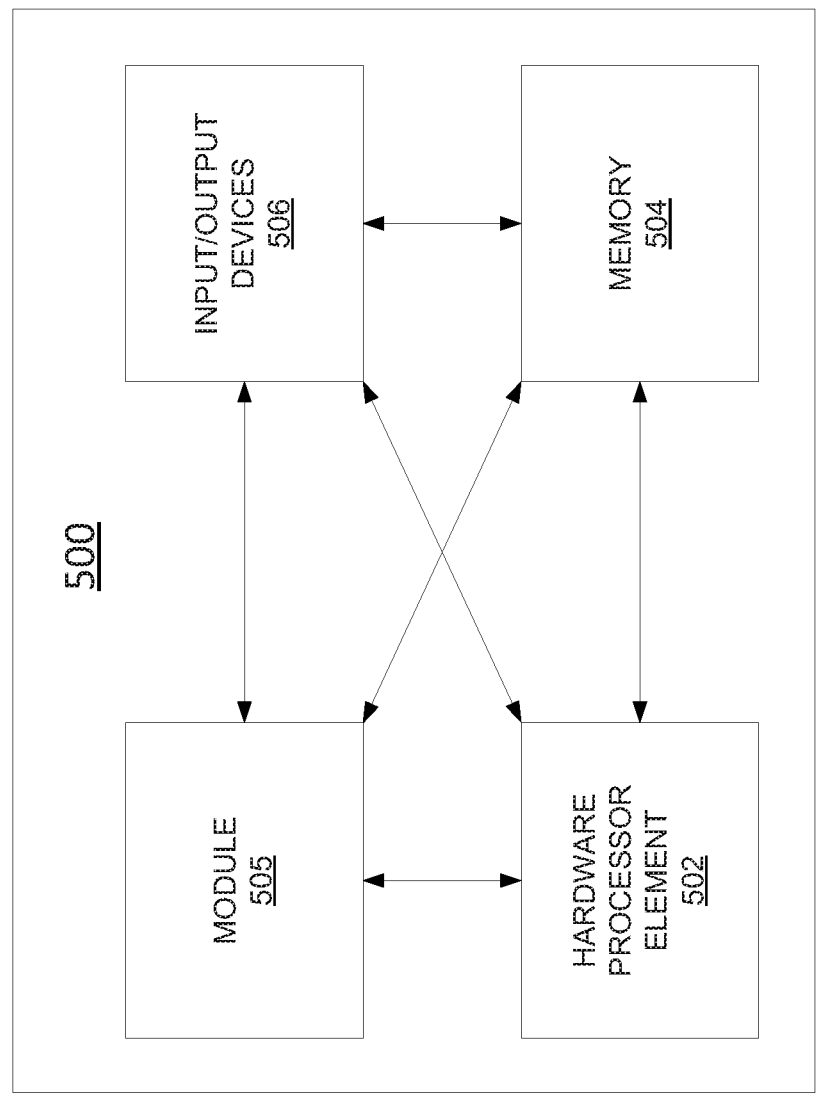
FIG. 5 illustrates a high level block diagram of a computing system specifically programmed to perform the steps, functions, blocks and/or operations described herein.

In one example, the AMS 190 may include a computing device or processing system, such as computing system 500 depicted in FIG. 5, and may be configured to provide one or more operations or functions in connection with examples of the present disclosure for supporting management and resolution of alarms.

It should be noted that the system 100 has been simplified. In other words, the system 100 may be implemented in a different form than that illustrated in FIG. 1. For example, the system 100 may be expanded to include additional networks, such as a network operations center (NOC) network, and additional network elements (not shown) such as border elements, routers, switches, policy servers, security devices, gateways, content distribution networks (CDNs), and the like, without altering the scope of the present disclosure. In addition, system 100 may be altered to omit various elements, substitute elements for devices that perform the same or similar functions and/or combine elements that are illustrated as separate devices. In one example, AMS 190 and/or other elements may include functions that are spread across several devices that operate collectively as an AMS 190. Thus, these and other modifications of the system 100 are all contemplated within the scope of the present disclosure.

Figure 2:
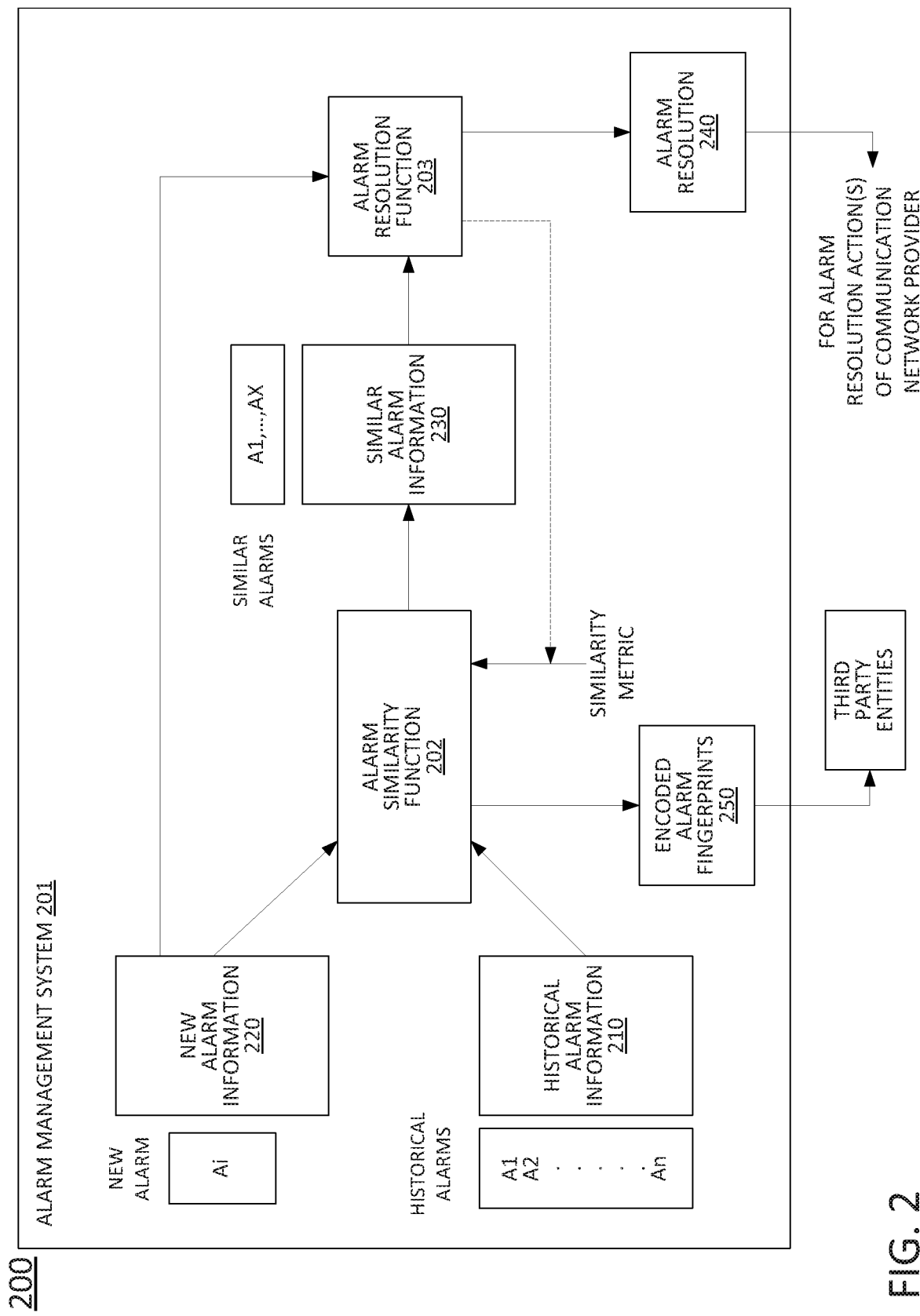
FIG. 2 illustrates an example process for supporting management and resolution of alarms of a communication network.

FIG. 2 illustrates an example process for supporting management and resolution of alarms of a communication network. The example process 200 presented with respect to FIG. 2 may be performed by an alarm management system (AMS) 201. In one example, the AMS 201 of FIG. 2 may be used as the AMS 190 presented with respect to FIG. 1; however, it will be appreciated that the AMS 201 of FIG. 2 also may be used in various other alarm management contexts.

In the example process 200, the AMS 201 is configured to support management and resolution of alarms. The management and resolution of alarms by the AMS 201 may be further understood by first considering various aspects of alarms and the manner in which such aspects of alarms may be used to support management and resolution of alarms. In general, an alarm (which may be denoted as alarm Ai) may have a set of alarm features associated therewith (e.g., alarm features include within the alarm, alarm features determined from one or more elements or systems based on information included within the alarm, and the like). The alarm features of an alarm may vary for different type of alarms. For example, for an alarm that is a security alarm, the alarm features of the alarm may include alarm features such as a malicious IP address, a malware name, a location of origin (e.g., continent of origin, country of origin, and the like), temporal information (e.g., day of week, time of day, and the like), an application, a programming language, a protocol, a port number, a malware signature, a command and control address, and the like. It will be appreciated that various types of alarms may include various different combinations of alarm features. The alarm features of an alarm may be maintained as a feature set (which, for an alarm Ai, may be represented as Ai={Fi1, Fi2, . . . , Fin}). The alarm may be represented using an alarm fingerprint generated for the alarm based on the alarm features of the alarm. The alarm fingerprint of an alarm may include hashed representations of the alarm features of the alarm (which, for an alarm Ai, may be represented as fingerprint(Ai)={hash(Fi1), hash(Fi2), . . . , hash(Fin)}). The alarm features of an alarm may be hashed, to form the alarm fingerprint of the alarm, based on various types of hashing algorithms such as a Secure Hash Algorithm (e.g., using SHA-3, SHA-2 with hash functions such as SHA-512 and SHA-256, and the like) or other suitable hashing algorithms. The alarm fingerprint of an alarm may be encoded to protect the information of the alarm. The alarm fingerprint of an alarm may be encoded, to form the encoded alarm fingerprint, based on various types of encoding mechanisms (e.g., Bloom filters or other types of encoding mechanisms). The AMS 201, as discussed further below, may be configured to support various alarm management and resolution functions which may be used to support handling of such alarms.

In the example process 200, the AMS 201 maintains historical alarm information 210 for a set of historical alarms which were previously handled by the AMS 201 and which may be used by the AMS 201 for handling new alarms. The historical alarms are depicted as alarms A1 . . . An. The n historical alarms which are considered in evaluating a new alarm may include all available historical alarms or a subset of the available historical alarms (e.g., the n most recent historical alarms, n alarms selected as a subset of the available historical alarms based on one or more conditions, and the like). The historical alarm information 210 for the set of historical alarms may include, for each of the historical alarms, the historical alarm (e.g., including the alarm features of the historical alarm), the alarm fingerprint of the historical alarm (e.g., hashes of the alarm features of the historical alarm), the encoded alarm fingerprint of the historical alarm, alarm resolution information for the historical alarm (e.g., an alarm resolution type of the historical alarm, a description of the alarm resolution of the historical alarm, a set of alarm resolution actions performed for resolving the historical alarm, one or more methods or procedures used for resolving the historical alarm, and the like), and so forth.

In the example process 200, the AMS 201 receives a new alarm and determines new alarm information 220 associated with the new alarm. The new alarm is depicted as new alarm Ai. The new alarm has a set of alarm features associated therewith (e.g., alarm features included within the new alarm, alarm features determined based on investigation of the alarm, and the like). The AMS 201 obtains the alarm features of the new alarm. The AMS 201 generates an alarm fingerprint of the new alarm. The alarm fingerprint of the new alarm may include the alarm features of the new alarm, hashes of the alarm features of the new alarm, and the like. The AMS 201 also may generate an encoded alarm fingerprint of the alarm fingerprint of the new alarm. The encoding of the alarm fingerprint to form the encoded alarm fingerprint may be based on various encoding mechanisms (e.g., using Bloom filters or other suitable encoding mechanisms). The new alarm information 220 for the new alarm may include the new alarm, the alarm fingerprint of the new alarm, and so forth.

In the example process 200, the AMS 201 determines, using the new alarm information 220 of the new alarm and the historical alarm information 210 of the set of historical alarms, a set of similar alarms for the new alarm. The similar alarms are depicted as similar alarms A1 . . . Ax, where the range of 1 to x may represent the fact that one or more of the n historical alarms may be included within the set of similar alarms (i.e., 1≤x≤n). The set of similar alarms for the new alarm may be used for determining an alarm resolution of the new alarm. The set of similar alarms for the new alarm may include one or more of the historical alarms determined to be similar to the new alarm. The set of similar alarms similar to the new alarm may be determined based on similarity of the set of alarm features of the new alarm to the sets of features of the historical alarms, which may be evaluated based on comparisons, based on a similarity metric, of the alarm fingerprint of the new alarm to the alarm fingerprints of the historical alarms. The set of similar alarms similar to the new alarm which are initially determined based on similarity of alarm fingerprints based on a similarity metric may be further refined based on one or more conditions (e.g., conditions to limit the number of similar alarms used for determining the alarm resolution of the new alarm, conditions to select a subset of the similar alarms that are more likely to be useful in determining an alarm resolution of the new alarm, and the like). In one example, the set of similar alarms similar to the new alarm may be determined by an alarm similarity function 202 of the AMS 201. The set of similar alarms similar to the new alarm, which may include one or more of the historical alarms, may be used to determine an alarm resolution of the new alarm.

The set of similar alarms similar to the new alarm may be determined based on comparison of the new alarm (based on the new alarm information 220 of the new alarm) to each of the historical alarms (based on the historical alarm information 210 of the historical alarms). The comparison of the new alarm to the historical alarms may be based on comparison of the alarm features of the new alarm to the alarm features of the historical alarms. The comparison of the alarm features of the new alarm to the alarm features of the historical alarms may be based on comparison of the alarm fingerprint of the new alarm to alarm fingerprints of the historical alarms. The comparison of the alarm fingerprint of the new alarm to the alarm fingerprints of the historical alarms may be based on a similarity metric configured to measure similarity between a pair of alarm fingerprints of a pair of alarms (namely, between the alarm fingerprint of the new alarm and each of the alarm fingerprints of each of the historical alarms). The similarity metric may be a distance-based metric configured to measure distance between a pair of alarm fingerprints of a pair of alarms or other suitable metric which may be used to determine similarity between a pair of alarm fingerprints of a pair of alarms. For example, the similarity metric may be a Jaccard similarity metric or other suitable metric which may be used to determine a distance between a pair of alarm fingerprints of a pair of alarms. For example, where a Jaccard similarity metric is used, the distance between a pair of alarm fingerprint of a pair of alarms may be computed as follows: $d(A_i, A_j) = |A_i \cap A_j|/|A_i \cup A_j|$, where $A_i$ may represent the alarm fingerprint of the new alarm and $A_j$ may represent the alarm fingerprint of the historical alarm that is being compared to the new alarm. The determination, based on a similarity metric, as to whether to add an historical alarm to the set of similar alarms for the new alarm may include determining a similarity value indicative of a similarity of the alarm fingerprint of the new alarm to the alarm fingerprint of the historical alarm and comparing the similarity value to a similarity threshold for determining whether to add the historical alarm to the set of similar alarms. The similarity value and the similarity threshold used to evaluate the similarity value may be determined based on the similarity metric. If the similarity between the alarm fingerprint of the new alarm and the alarm fingerprint of the historical alarm does not satisfy the similarity threshold (e.g., the determined similarity value, such as the distance $d(A_i, A_j)$ where the Jaccard similarity metric is used, is less than the similarity threshold), then the historical alarm is not selected as a similar alarm and, thus, not included in the set of similar alarms similar to the new alarm. If the similarity between the alarm fingerprint of the new alarm and the alarm fingerprint of the historical alarm satisfies the similarity threshold (e.g., the determined similarity value, such as the distance $d(A_i, A_j)$ where the Jaccard similarity metric is used, is greater than the similarity threshold), then the historical alarm is selected as a similar alarm and, thus, included in the set of similar alarms similar to the new alarm. In one example, the similarity values may be determined based on weighting of alarm features of the alarms being compared. It will be appreciated that the set of similar alarms, including one or more of the historical alarms determined to be similar to the new alarm, may be determined in various other ways (e.g., based on use of other types of similarity metrics, based on use of similarity metrics in other ways, and the like).

The set of similar alarms similar to the new alarm that is used to determine an alarm resolution for the new alarm may include each of the historical alarms identified as being similar to the new alarm or may include a subset of the historical alarms identified as being similar to the new alarm. In other words, the set of similar alarms similar to the new alarm, which is determined based on similarity of the alarm features of the new alarm to the alarm features of the historical alarms, may be further refined to obtain the set of similar alarms that is used to determine an alarm resolution for the new alarm. The set of similar alarms similar to the new alarm may be further refined, to obtain the set of similar alarms that is used to determine the alarm resolution for the new alarm, based on one or more conditions (e.g., conditions to limit the number of similar alarms used for determining the alarm resolution of the new alarm, conditions to select a subset of the similar alarms that are more likely to be useful in determining an alarm resolution of the new alarm, and the like). In one example, where the set of similar alarms similar to the new alarm includes more than a threshold number of similar alarms (e.g., a threshold of k similar alarms), the top k similar alarms may be selected, from the set of similar alarms determined based on the similarity metric, to form the set of similar alarms (e.g., the k similar alarms having the greatest similarity values). In one example, after the set of similar alarms similar to the new alarm is determined based on the similarity metric, a subset of the similar alarms may be selected based on one or more conditions (e.g., selecting any of the similar alarms having automated resolutions associated therewith). In one example, the set of similar alarms determined based on the similarity metric may be further refined based on a combination of such conditions (e.g., selecting the top k similar alarms in terms of greatest similarity values that also have automated resolutions associated therewith). It will be appreciated that the set of similar alarms similar to the new alarm, which is determined based on the similarity metric, may be further refined in various other ways to obtain the set of similar alarms that is used to determine an alarm resolution for the new alarm.

In the example process 200, the AMS 201 determines similar alarm information 230 of the set of similar alarms similar to the new alarm. The similar alarm information 230 of the set of similar alarms similar to the new alarm may include at least a portion of the historical alarm information 210 of the similar alarms (e.g., the historical alarms (e.g., including the alarm features of the historical alarms), the alarm fingerprints of the historical alarms (e.g., hashes of the alarm features of the historical alarms), the encoded alarm fingerprints of the historical alarms, alarm resolution information for the historical alarms (e.g., alarm resolution types of the historical alarms, descriptions of the alarm resolutions of the historical alarms, sets of alarm resolution actions performed for resolving the historical alarms, and the like), and so forth), the similarity values determined for the similar alarms, and so forth. It will be appreciated that the similar alarm information 230 for the set of similar alarms similar to the new alarm may include various other types of information.

In the example process 200, the AMS 201 determines an alarm resolution 240 of the new alarm. The alarm resolution 240 of the new alarm may be determined based on the similar alarm information 230 of the set of similar alarms (e.g., using the alarm resolution of the similar alarm having the highest similarity value). The alarm resolution of the new alarm may be determined based on the new alarm information 220 of the new alarm and the similar alarm information 230 of the set of similar alarms (e.g., using the alarm resolutions of one or more of the similar alarms and the alarm features of the new alarm to construct the alarm resolution of the new alarm). It will be appreciated, as discussed further below, that the similar alarm information 230 of the similar alarms in the set of similar alarms and the new alarm information 220 of the new alarm may be used in various ways for determining the alarm resolution 240 of the new alarm. The alarm resolution of the new alarm may include various types of alarm resolutions which may be used to resolve various types of alarms which may be associated with a communication network. In one example, the alarm resolution 240 of the new alarm may be determined by an alarm resolution function 203 of the AMS 201.

In one example, the alarm resolution 240 of the new alarm may be determined by using the alarm resolution, or a modified version of the alarm resolution, of one of the historical alarms in the set of similar alarms. For example, the alarm resolution of the similar alarm having the highest similarity value may be used as the alarm resolution 240 of the new alarm or may be used as a basis for determining the alarm resolution 240 of the new alarm (e.g., the alarm resolution of the similar alarm may be modified, based on analysis of the alarm features of the similar alarm and the alarm features of the new alarm, to form the alarm resolution for the new alarm).

In one example, the alarm resolution 240 of the new alarm may be determined by using the alarm resolutions, or modified versions of the alarm resolutions, of multiple historical alarms in the set of similar alarms (e.g., the similar alarms having the highest similarity values, the similar alarms having the highest similarity values and automated resolutions, and the like). For example, a subset of the similar alarms, including the similar alarms having the highest similarity values and automated resolutions, may be analyzed in order to determine the alarm resolution 240 of the new alarm (e.g., analyzing the alarm resolutions of the selected subset of similar alarms to determine common aspects of the alarm resolutions and processing the common aspects of the alarm resolutions to determine the alarm resolution 240 of the new alarm).

In one example, the alarm resolution 240 of the new alarm may be determined based on application of machine learning techniques to analyze the new alarm information 220 of the new alarm and the similar alarm information 230 of the set of similar alarms. The machine learning techniques may be used to construct the alarm resolution 240 of the new alarm based on analysis of the alarm features of the new alarm and the alarm resolutions of the similar alarms in the set of similar alarms.

In one example, the alarm resolution 240 of the new alarm may include blocking a device (e.g., an end user device identified as being malicious where the new alarm is a security alarm), reconfiguring one or more network devices (e.g., establishing or terminating connections, allocating or deallocating resources, and the like), notifying one or more entities (e.g., a customer, a user of an asset, an owner of an asset, and the like), and so forth. It will be appreciated that various other types of alarm resolutions may be used for resolving the new alarm.

In the example process 200, the AMS 201 initiates, based on the alarm resolution 240 of the new alarm, an alarm resolution action for providing the alarm resolution of the new alarm. For example, where the alarm resolution 240 of the new alarm includes blocking an end user device, the AMS 201 may initiate one or more messages to one or more network devices for causing the device to be blocked (e.g., sending a message to a network device of a core network to block the device, sending a message to a network device of an access network to block the device, and the like). For example, where the alarm resolution 240 of the new alarm includes reconfiguring a network device, the AMS 201 may initiate one or more messages to the network device that are configured to cause a reconfiguration of the network device (e.g., establishment or termination of a connection on the network device, allocation or deallocation of resources on the network device, and the like). For example, where the alarm resolution 240 of the new alarm includes a notification, the AMS 201 may initiate one or more notification messages to one or more entities (e.g., a customer, a user of an asset, an owner of an asset, and the like). It will be appreciated that the AMS 201 may be configured to initiate various other resolution actions configured to support resolution of the new alarm.

It will be appreciated that the example process 200 may be further understood with respect to an example. For example, assume that a new security alarm is received by the AMS 201. The new security alarm includes some alarm features describing the security alarm, such as an IP address associated with a malicious message of a malicious device which triggered the security alarm, an indication of a device to which the malicious message was directed, an indication of a protocol of the malicious message, and a malware name and a malware signature associated with the malicious message. The AMS 201 uses the IP address included within the security alarm to determine a device identifier of the malicious device. The AMS 201 generates an alarm fingerprint including hashed versions of the six alarm features related to the security alarm: namely, the IP address of the malicious device, the device identifier of the malicious device, the device identifier of the attacked device, the protocol type of the protocol, the malware name, and the malware signature. The AMS 201 compares the alarm fingerprint of the security alarm with alarm fingerprints of thousands of previous alarms handled by the AMS 201 and identifies eight similar alarms having a certain level of similarity to the security alarm. The AMS 201 analyzes the alarm features of the security alarm and the alarm features of the similar alarms, as well as the alarm resolutions of the similar alarms, to determine the alarm resolution for the security alarm. For example, the AMS 201 may determine, from the historical alarm information of the similar alarms, that the same device was attacked with the same malware by other malicious devices in the past. The alarm resolutions of those similar alarms indicate that blocking of the malicious devices associated with those similar alarms, using a particular type of blocking at a particular location within the network, prevented further attacks by those malicious devices. The AMS 201 may then determine that the alarm resolution for the security alarm is to block the malicious device of the security alarm by adding the device identifier of the malicious device to a blacklist at a particular element in the core network portion of the communication network. The AMS 201 may send a message to a network controller to cause the network controller to trigger configuration of the network add the device identifier of the malicious device to the blacklist. In this manner, previous resolutions of similar alarms enabled automated, more efficient resolution of the new security alarm.

In the example process 200, the AMS 201 may determine a refinement of the similarity metric for use in handling future alarms. The refinement of the similarity metric may be based on the alarm resolution process (e.g., the alarm resolution 240 of the new alarm and/or various aspects of the process by which the alarm resolution 240 of the new alarm was determined by the alarm resolution function 203 and/or the process by which new alarm was resolved by the AMS 201, resolution of previous alarms now considered to be part of the set of historical alarms and/or various aspects of the processes by which the previous alarms were resolved, and so forth). The refinement of the similarity metric may be based on one or more other factors, such as one or more factors related to the volume of alarms being observed and handled, one or more factors related to the types of alarms being observed and handled, one or more temporal factors (e.g., time of day, day of the week, day of the year and so forth, where such temporal factors may be related to the volume of alarms being received, the types of alarms being observed and handled, and so forth), and the like. The refinement of the similarity metric may include changing a manner in which the similarity value of the similarity metric is computed, changing a similarity threshold used for determining similarity based on the similarity metric, changing the type of similarity metric that is used, and the like). For example, where a larger than usual volume of alarms is observed or expected, the similarity threshold used for determining similarity of new alarms to historical alarms may be raised in order to limit the number of similar alarms which need to be evaluated to determine the alarm resolutions of the new alarms. For example, where a larger than usual volume of alarms of a particular type is observed or expected, the similarity threshold used for determining similarity of new alarms to historical alarms may be lowered to ensure that a reasonable number of historical alarms are identified as being similar in order to provide similar alarms which may be evaluated to determine alarm resolution of new alarms of that alarm type. It will be appreciated that the similarity metric may be refined based on various other inputs, in various other ways, and the like. It will be appreciated that this may provide a feedback loop such that knowledge obtained based on handling of alarms may be used to improve the similarity metric applied for identification of similar historical alarms during handling of new alarms in the future and, thus, also improve the handling of new alarms in the future.

In the example process 200, the AMS 201, in addition to supporting handling of new alarms by the communication network provider, may make certain portions of alarm information available to certain third parties (e.g., customers of the communication network provider, such as enterprise customers, or other suitable third parties). The AMS 201 may make alarm fingerprints of alarms available to third parties. The AMS 201 may make the alarm fingerprints available to the third parties in an encoded format to protect the alarm information that is made available to the third parties. In one example, the encoding of the alarm fingerprints may be performed using Bloom filters, although it will be appreciated that other encoding mechanisms may be used for encoding the alarm fingerprints. The AMS 201 may make the encoded alarm fingerprints available to the third parties by providing the encoded alarm fingerprints to the third parties as the alarm fingerprints are determined, by responding to queries from the third parties, and so forth. This is depicted as encoded alarm fingerprints 250.

In one example, the communication network provider may provide encoded alarm fingerprints 250 to third parties as the alarm fingerprints are generated during handling of new alarms (here, the encoded alarm fingerprints 250 may represent the set encoded alarm fingerprints provided as they are generated). The encoding of alarm fingerprints may be based on various types of encoding mechanisms. In one example, the encoding of alarm fingerprints may be based on use of data structures configured to indicate which elements are present in a data set without revealing the details of the elements (e.g., Bloom filters of other similar data structures). It will be appreciated that the use of such data structures for encoding alarm fingerprints enables the third party to determine which alarm features are present in particular alarms without the details of those alarm features being revealed to the third party, thereby protecting the details of the alarms (e.g., customers, applications, IP addresses, and various other types of personal information which may be included within or associated with alarms). For example, the third party may determine, based on the bits set in the Bloom filter encoding the alarm fingerprint of the alarm, that the alarm includes an IP address, a port number, a protocol, a malware name, and a malware signature, without seeing the details of these features of the alarms. It will be further appreciated that, although the details of the alarms are not revealed to the third parties, the encoded alarm fingerprints 250 still provide information which may be analyzed by the third parties for various purposes. For example, analyzing the manner in which the bits are set in the Bloom filters encoding the alarm fingerprints of alarms may be used to determine various types of encoded alarm fingerprint analytics information, such as alarm volume information (e.g., the volume of alarms including IP addresses, the volume of alarms including a malware name and a malware signature, and the like), alarm trend information (e.g., increases or decreases in the number of alarms including a malware name and a malware signature, increases or decreases in the number of alarms including a protocol, and the like), and so forth. In this manner, the third parties may determine which alarm features are present in particular alarms without the details of those alarm features being revealed to the third party, thereby protecting the details of the alarms (e.g., customers, applications, IP addresses, and various other types of personal information which may be included within or associated with alarms).

In one example, the communication network provider (e.g., the AMS 201) may provide encoded alarm fingerprints 250 to third parties based on encoded alarm fingerprint queries received from the third parties. For example, a third party may initiate a query to the AMS 201 that includes a target encoded alarm fingerprint and that requests that the AMS 201 identify and provide similar encoded alarm fingerprints similar to the target encoded alarm fingerprint. The AMS 201 may receive the query from the third party including the target encoded alarm fingerprint, compare the target encoded alarm fingerprint to encoded alarm fingerprints maintained by the AMS 201 (e.g., the encoded alarm fingerprint of the new alarm and the encoded alarm fingerprints of the historical alarms) to identify a set of similar encoded alarm fingerprints, and provide a query response to the third party that includes the set of similar encoded alarm fingerprints (here, the encoded alarm fingerprints 250 may represent the set of similar encoded alarm fingerprints provided in response to a query). The AMS 201 may compare the target encoded alarm fingerprint to encoded alarm fingerprints maintained by the AMS 201, to identify the set of similar encoded alarm fingerprints, based on use of a similarity metric which may be used to compare encoded data structures (e.g., Bloom filters, where Bloom filters are used as the encoding mechanism). In one example, the similarity metric that is used to compare the target encoded alarm fingerprint with one of the encoded alarm fingerprints may be the Tanimoto similarity metric, which may be used to compute the similarity between encoded data structures (e.g., the similarity between the bit arrays of two Bloom filters of size s, where encoding of the alarm fingerprints is based on use of Bloom filters). For example, assuming that Bi and Bj are bit arrays corresponding to alarms Ai and Aj (e.g., Bloom filters encoding the alarm fingerprints representing the alarm features of alarm Ai and the alarm features of alarm Aj), respectively, then the Tanimoto similarity metric may be computed as: $T(B_i,j)=(\Sigma(B_{ik} \wedge B_{jk}))/(\Sigma(B_{ik} \ B_{jk}))$, where $1 \le k \le s$. Here, if Bi is identical to Bj (representing the fact that the two alarms have the same alarm features) then $T(B_i,B_j)=1$, whereas if there is no same bit position set in the bit vectors of Bi and Bj (representing the fact that the two alarms have no similar alarm features) then $T(B_i,B_j)=0$. It will be appreciated that, although primarily described with respect to use of the Tanimoto similarity metric for identifying the similar encoded alarm fingerprints, various other suitable similarity metrics may be used for comparing encoded alarm fingerprints to identify the similar encoded alarm fingerprints. It will be appreciated that, although the details of the alarms are not revealed to the third parties, the encoded alarm fingerprints still provide information which may be analyzed by the third parties for various purposes. For example, analyzing the manner in which the bits are set in the Bloom filters encoding the alarm fingerprints of alarms may be used to determine whether the communication network provider is observing alarms similar to those being observed by the third party (e.g., in their enterprise network, where the third party is a customer of the communication network provider). In this manner, the third parties may determine which alarm features are present in particular alarms without the details of those alarm features being revealed to the third party, thereby protecting the details of the alarms (e.g., customers, applications, IP addresses, and various other types of personal information which may be included within or associated with alarms).

It will be appreciated that the third parties may use the encoded alarm fingerprint information (e.g., encoded alarm fingerprints pushed to the third party entity, encoded alarm fingerprint query results provided to the third party entity, and the like) and/or encoded alarm fingerprint analytics information (e.g., results of trend analytics based on encoded alarm fingerprints) for various purposes. In one example, a third party entity may use the encoded alarm fingerprint information and/or the encoded alarm fingerprint analytics information to initiate one or more actions in a third party network of the third party (e.g., a configuration action, a reconfiguration action, a security action, a notification action, and the like). In one example, a third party entity may use the encoded alarm fingerprint information and/or the encoded alarm fingerprint analytics information to request that the communication network provider perform one or more actions in the communication network on behalf of the third party (e.g., a configuration action, a reconfiguration action, a security action, and the like). It will be appreciated that the third parties may use the encoded alarm fingerprint information and/or the encoded alarm fingerprint analytics information for various other purposes even though the third party entities are unable to access the details of the alarms upon which the encoded alarm fingerprint information and, thus, the encoded alarm fingerprint analytics information, is based.

It will be appreciated that, although examples presented herein describe scenarios in which certain information may be provided from the communication network provider to third party entities, the communication network provider will take all necessary precautions to protect the privacy of any information which may be provided to third parties. Namely, as discussed above, the encoding of the alarm fingerprints which may be provided from the communication network provider to third party entities enables the third party entities to receive information about the types of alarm features which are being observed in alarms without obtaining any of the details of the alarm features which are being observed in alarms, thereby protecting any personal or private information which may be included in the alarms.

Figure 3:
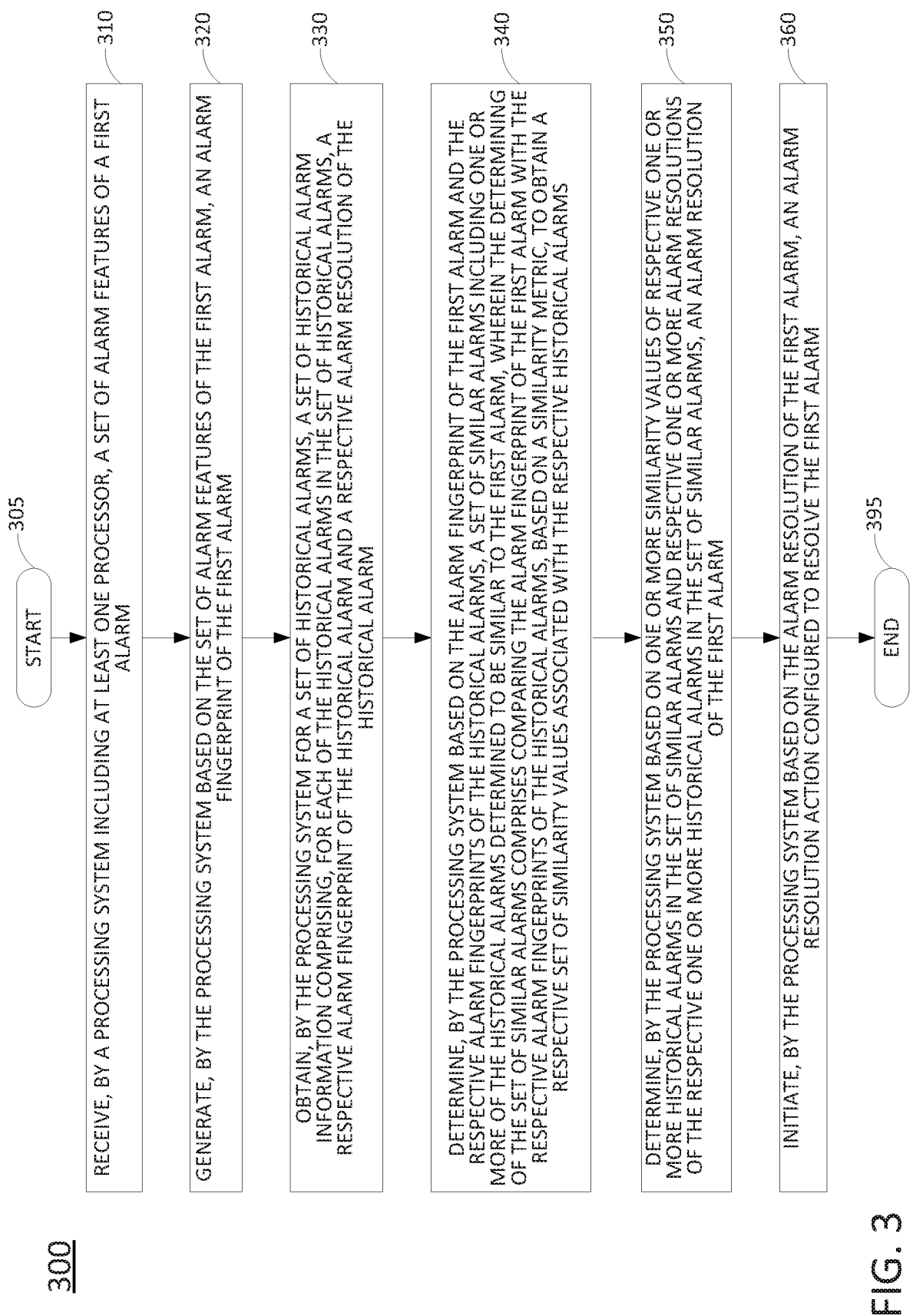
FIG. 3 illustrates a flowchart of an example method for supporting management and resolution of alarms of a communication network.

FIG. 3 illustrates a flowchart of an example method for supporting management and resolution of alarms of a communication network. In one example, the method 300 is performed by an alarm management system (e.g., the AMS 190 of FIG. 1) or by one or more components thereof (e.g., a processor, or processors, performing operations stored in and loaded from a memory), or by an alarm management system in conjunction with one or more other components. In one example, the steps, functions, or operations of method 300 may be performed by a computing device or processing system, such as computing system 500 and/or hardware processor element 502 as presented with respect to FIG. 5. For instance, the computing system 500 may represent any one or more components of the system 100 and/or the process 200 that is/are configured to perform the steps, functions and/or operations of the method 300. Similarly, in one example, the steps, functions, or operations of method 300 may be performed by a processing system including one or more computing devices collectively configured to perform various steps, functions, and/or operations of the method 300. For instance, multiple instances of the computing system 500 may collectively function as a processing system. For illustrative purposes, the method 300 is described in greater detail below in connection with an example performed by a processing system. The method 300 begins in step 305 and proceeds to step 310.

At step 310, the processing system may receive a set of alarm features of a first alarm. In one example, at least one of the alarm features in the set of alarm features of the first alarm is retrieved from the first alarm. In one example, at least one of the alarm features of the set of alarm features of the first alarm is determined based on an investigation of the first alarm.

At step 320, the processing system may generate, based on the set of alarm features of the first alarm, an alarm fingerprint of the first alarm. In one example, the generating of the alarm fingerprint of the first alarm includes generating, by the processing system based on the set of alarm features of the first alarm, a set of hashes for the first alarm, wherein the set of hashes for the first alarm includes, for each of the alarm features in the set of alarm features of the first alarm, a respective hash of the respective alarm feature and generating, by the processing system based on the set of hashes for the first alarm, the alarm fingerprint of the first alarm, wherein the alarm fingerprint of the first alarm includes a data structure including the set of hashes for the first alarm.

At step 330, the processing system may obtain, for a set of historical alarms, a set of historical alarm information including, for each of the historical alarms in the set of historical alarms, a respective alarm fingerprint of the historical alarm and a respective alarm resolution of the historical alarm.

At step 340, the processing system may determine, based on the alarm fingerprint of the first alarm and the respective alarm fingerprints of the historical alarms, a set of similar alarms including one or more of the historical alarms determined to be similar to the first alarm, wherein the determining of the set of similar alarms includes comparing the alarm fingerprint of the first alarm with the respective alarm fingerprints of the historical alarms, based on a similarity metric, to obtain a respective set of similarity values associated with the respective historical alarms. In one example, for at least one of the alarm fingerprints of at least one of the historical alarms, the respective similarity value associated with the respective historical alarm is based on a distance between the alarm fingerprint of the first alarm and the respective alarm fingerprint of the respective historical alarm. In one example, the similarity metric includes a distance-based metric. In one example, the distance-based metric includes a Jaccard similarity metric. In one example, the set of similar alarms is determined based on a similarity threshold associated with the similarity metric. In one example, the similarity threshold is based on an analysis of at least a portion of the historical alarms in the set of historical alarms. In one example, the determining of the set of similar alarms is based on, for at least one of the historical alarms, whether the resolution of the respective historical alarm includes an automated resolution.

At step 350, the processing system may determine, based on one or more similarity values of respective one or more historical alarms in the set of similar alarms and respective one or more alarm resolutions of the respective one or more historical alarms in the set of similar alarms, an alarm resolution of the first alarm. In one example, the determining of the alarm resolution of the first alarm includes selecting, by the processing system from the set of similar alarms based on the respective one or more similarity values of the respective one or more historical alarms in the set of similar alarms and the respective one or more alarm resolutions of the respective one or more historical alarms in the set of similar alarms, one of the similar alarms and determining, by the processing system based on the respective alarm resolution of the one of the similar alarms, the alarm resolution of the first alarm. In one example, the one of the similar alarms includes one of the historical alarms, from ones of the similar alarms in the set of similar alarms for which the respective alarm resolution of the respective historical alarm includes an automated resolution, having a greatest similarity value.

At step 360, the processing system may initiate, based on the alarm resolution of the first alarm, an alarm resolution action configured to resolve the first alarm. In one example, the alarm resolution action includes at least one of a blocking of an end device, a configuration of a network device, and a sending of a notification related to a device. Following step 360, the method 300 proceeds to step 395 where the method 300 ends.

It should also be noted that the method 300 may be expanded to include additional steps, or may be modified to replace steps with different steps, to combine steps, to omit steps, to perform steps in a different order, and so forth. It will be appreciated that these and other modifications are all contemplated within the scope of the present disclosure.

In addition, although not expressly specified above, one or more steps of the method 300 may include a storing, displaying, and/or outputting steps as required for a particular application. In other words, any data, records, fields, and/or intermediate results discussed in the method can be stored, displayed, and/or outputted to another device as required for a particular application. Furthermore, operations, steps, or blocks in FIG. 3 that recite a determining operation or involve a decision do not necessarily require that both branches of the determining operation be practiced. In other words, one of the branches of the determining operation can be deemed as an optional step. Thus, the use of the term "optional step" is intended to only reflect different variations of a particular illustrative example and is not intended to indicate that steps not labelled as optional steps are to be deemed to be essential steps. Furthermore, operations, steps or blocks of the above described method(s) can be combined, separated, and/or performed in a different order from that described above, without departing from the examples of the present disclosure.

Figure 4:
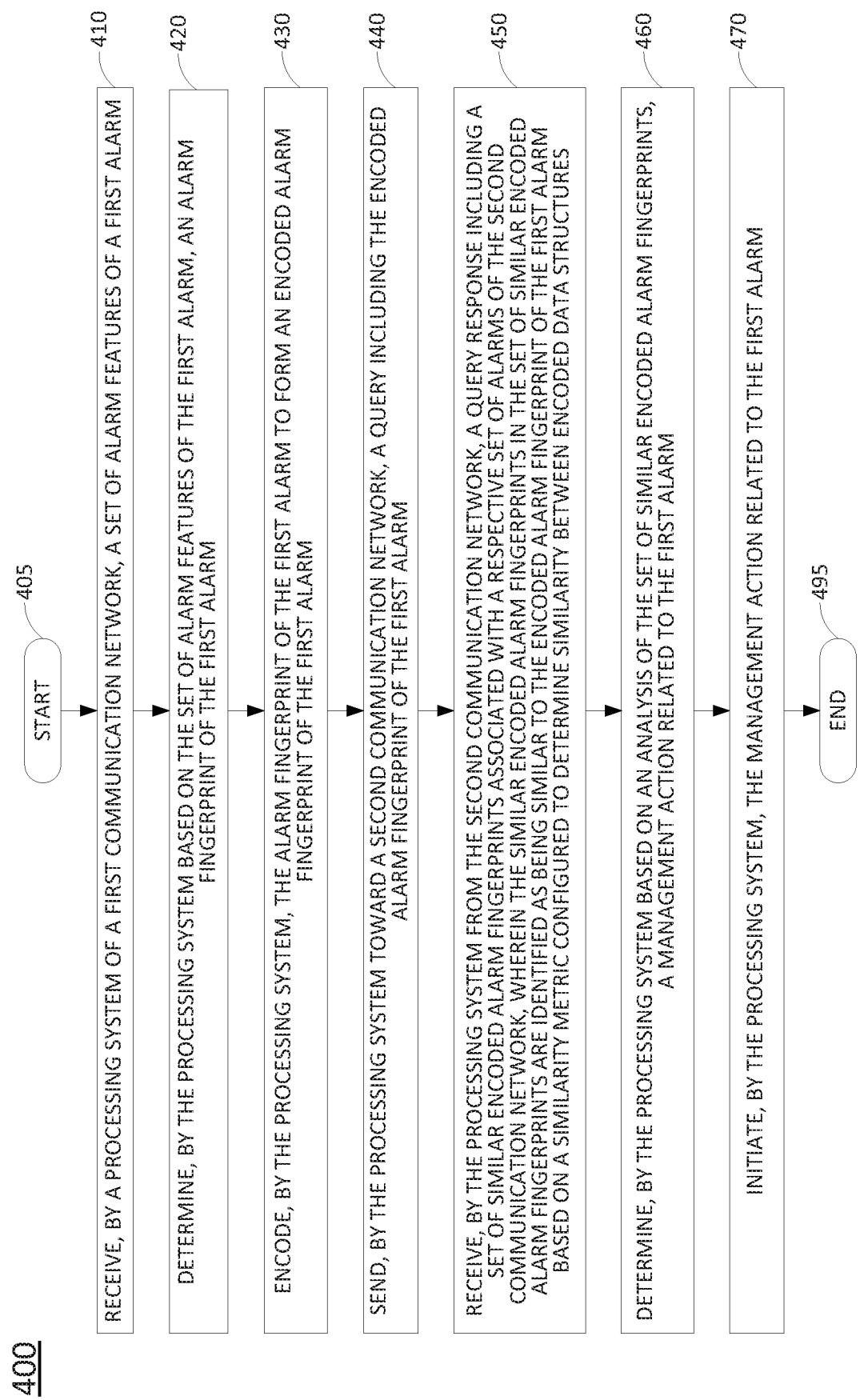
FIG. 4 illustrates a flowchart of an example method for supporting management and resolution of alarms of a communication network.

FIG. 4 illustrates a flowchart of an example method for supporting management and resolution of alarms of a communication network. In one example, the method 400 is configured to enable a third party entity associated with a communication network provider to obtain alarm information from the communication network provider. In one example, the method 400 may be performed by an element of the third party entity (e.g., a management system, a network element, and the like) associated with the communication network provider, or by one or more components thereof (e.g., a processor, or processors, performing operations stored in and loaded from a memory). In one example, the steps, functions, or operations of method 400 may be performed by a computing device or processing system, such as computing system 500 and/or hardware processor element 502 as presented with respect to FIG. 5. For instance, the computing system 500 may represent any one or more components of the system 100 and/or the process 200 that is/are configured to perform the steps, functions and/or operations of the method 400. Similarly, in one example, the steps, functions, or operations of method 400 may be performed by a processing system including one or more computing devices collectively configured to perform various steps, functions, and/or operations of the method 400. For instance, multiple instances of the computing system 500 may collectively function as a processing system. For illustrative purposes, the method 400 is described in greater detail below in connection with an example performed by a processing system. The method 400 begins in step 405 and proceeds to step 410.

At step 410, the processing system of a first communication network may receive a set of alarm features of a first alarm. In one example, the second communication network is operated by a communication network provider and the first communication network is operated by a third party entity associated with the communication network provider (e.g., an enterprise network of an enterprise customer of the communication network provider). In one example, at least one of the alarm features in the set of alarm features of the first alarm is determined from the first alarm (e.g., one or more alarm features are included in the alarm). In one example, at least one of the alarm features of the set of alarm features of the first alarm is determined based on an investigation of the first alarm.

At step 420, the processing system may determine, based on the set of alarm features of the first alarm, an alarm fingerprint of the first alarm. In one example, the alarm fingerprint of the first alarm may include a set of hashes of the alarm features of the first alarm.

At step 430, the processing system may encode the alarm fingerprint of the first alarm to form an encoded alarm fingerprint of the first alarm. In one example, the alarm fingerprint of the first alarm may be encoded, to form the encoded alarm fingerprint of the first alarm, based on a Bloom filter or other suitable encoding mechanism.

At step 440, the processing system may send, toward the second communication network, a query including the encoded alarm fingerprint of the first alarm.

At step 450, the processing system may receive, from the second communication network, a query response including a set of similar encoded alarm fingerprints associated with a respective set of alarms of the second communication network, wherein the similar encoded alarm fingerprints in the set of similar encoded alarm fingerprints are identified as being similar to the encoded alarm fingerprint of the first alarm based on a similarity metric configured to determine similarity between encoded data structures. In one example, the similar encoded alarm fingerprints in the set of similar encoded alarm fingerprints may be encoded based on Bloom filters or other suitable encoding mechanisms. In one example, the similarity metric may be a Tanimoto similarity metric or other suitable similarity metric.

At step 460, the processing system may determine, based on an analysis of the set of similar encoded alarm fingerprints, a management action related to the first alarm. In one example, the analysis of the set of similar encoded alarm fingerprints may be configured to identify a trend associated with at least one type of alarm feature. In one example, the management action related to the first alarm includes at least one of a management action for the first communication network and a management action for the second communication network. In one example, the management action related to the first alarm includes at least one of a device blocking action, a configuration action, or a notification action.

At step 470, the processing system may initiate the management action related to the first alarm. In one example, the processing system may initiate the management action related to the first alarm by at least one of sending one or more messages to one or more elements of the first communication network or sending one or more messages to one or more elements of the second communication network. Following step 470, the method 400 proceeds to step 495 where the method 400 ends.

It should also be noted that the method 400 may be expanded to include additional steps, or may be modified to replace steps with different steps, to combine steps, to omit steps, to perform steps in a different order, and so forth. It will be appreciated that these and other modifications are all contemplated within the scope of the present disclosure.

In addition, although not expressly specified above, one or more steps of the method 400 may include a storing, displaying, and/or outputting steps as required for a particular application. In other words, any data, records, fields, and/or intermediate results discussed in the method can be stored, displayed, and/or outputted to another device as required for a particular application. Furthermore, operations, steps, or blocks in FIG. 4 that recite a determining operation or involve a decision do not necessarily require that both branches of the determining operation be practiced. In other words, one of the branches of the determining operation can be deemed as an optional step. Thus, the use of the term "optional step" is intended to only reflect different variations of a particular illustrative example and is not intended to indicate that steps not labelled as optional steps are to be deemed to be essential steps. Furthermore, operations, steps or blocks of the above described method(s) can be combined, separated, and/or performed in a different order from that described above, without departing from the examples of the present disclosure.

It will be appreciated that various examples presented herein for supporting management and resolution of alarms may provide various advantages or potential advantages. For example, various examples presented herein for supporting management and resolution of alarms may speed up the analyst vetting process and analyst investigation efficiency. For example, various examples presented herein for supporting management and resolution of alarms may enable automation of the investigating process by automatically applying similar methods, procedures, and results from similar historical alarms. For example, various examples presented herein for supporting management and resolution of alarms may ensure that, as soon as alarm features of a new alarm are collected, even before investigation of the new alarm begins, the analysis entity (e.g., an automated analysis entity or a human analyst) has access to similar alarms and associated alarm information which provides significantly more context and intelligence to the investigation and resolution of the new alarm, thereby reducing the analysis and, thus, reaction, time due to the improved correlation of similar alarms and associated alarm information. For example, various examples presented herein for supporting management and resolution of alarms may enable significant decreases in alarm reaction and resolution times. For example, various examples presented herein for supporting management and resolution of alarms may enable security automation. For example, various examples presented herein for supporting management and resolution of alarms may enable efficient support for analysis and resolution of alarms even as the number of alarms, and the amount of relevant data generated for alarm analysis purposes, continued to increase with increases in numbers of devices being used, numbers of applications being used, and network traffic volumes. For example, various examples presented herein for supporting management and resolution of alarms may enable efficient support for analysis and resolution of alarms in a manner supporting prioritization of alarms for rapid identification and handling of the most important alarms, supporting reductions in false positives, and so forth. For example, various examples presented herein for supporting management and resolution of alarms may obviate the need for hiring of additional alarm analysts to handle increasing numbers of alarms. For example, various examples presented herein for supporting management and resolution of alarms may obviate the need for use of security alarm detection mechanisms that may tip off the detection mechanisms to malicious entities (e.g., predefined signatures, labels, and so forth). For example, various examples presented herein for supporting management and resolution of alarms may enable creation and use of automated remediation mechanisms based on similar methods and procedures used for similar historical alarms. For example, various examples presented herein for supporting management and resolution of alarms may enable sharing of alarm information without revealing the contents of the alarms and, thus, while protecting any personal or private information which may be included within or otherwise associated with alarms. It will be appreciated that various examples presented herein for supporting management and resolution of alarms may provide various other advantages or potential advantages.

It will be appreciated that, as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may include a computing device, or computing system, including one or more processors, or cores (e.g., as illustrated in FIG. 5 and discussed below) or multiple computing devices collectively configured to perform various steps, functions, and/or operations in accordance with the present disclosure.

FIG. 5 depicts a high-level block diagram of a computing system 500 (e.g., a computing device or processing system) specifically programmed to perform the functions described herein. For example, any one or more components or devices illustrated in FIG. 1 or FIG. 2, or described in connection with the method 300 of FIG. 3 or the method 400 of FIG. 4, may be implemented as the computing system 500. As depicted in FIG. 5, the computing system 500 includes a hardware processor element 502 (e.g., including one or more hardware processors, which may include one or more microprocessor(s), one or more central processing units (CPUs), and/or the like, where the hardware processor element 502 may also represent one example of a "processing system" as referred to herein), a memory 504, (e.g., random access memory (RAM), read only memory (ROM), a disk drive, an optical drive, a magnetic drive, and/or a Universal Serial Bus (USB) drive), a module 505 for supporting management and resolution of alarms of a communication network, and one or more input/output devices 506, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

It will be appreciated that, although only one hardware processor element 502 is shown, the computing system 500 may employ a plurality of hardware processor elements. Furthermore, although only one computing device is shown in FIG. 5, if the method(s) as discussed above is implemented in a distributed or parallel manner for a particular illustrative example, e.g., the steps of the above method(s) or the entire method(s) are implemented across multiple or parallel computing devices, then the computing system 500 of FIG. 5 may represent each of those multiple or parallel computing devices. Furthermore, one or more hardware processor elements (e.g., hardware processor element 502) can be utilized in supporting a virtualized or shared computing environment. The virtualized computing environment may support one or more virtual machines which may be configured to operate as computers, servers, or other computing devices. In such virtualized virtual machines, hardware components such as hardware processors and computer-readable storage devices may be virtualized or logically represented. The hardware processor element 502 can also be configured or programmed to cause other devices to perform one or more operations as discussed above. In other words, the hardware processor element 502 may serve the function of a central controller directing other devices to perform the one or more operations as discussed above.

It will be appreciated that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer-readable instructions pertaining to the method(s) discussed above can be used to configure one or more hardware processor elements to perform the steps, functions and/or operations of the above disclosed method(s). In one example, instructions and data for the module 505 for supporting management and resolution of alarms of a communication network (e.g., a software program including computer-executable instructions) can be loaded into memory 504 and executed by hardware processor element 502 to implement the steps, functions or operations as discussed above in connection with the example method 300 or the example method 400. Furthermore, when a hardware processor element executes instructions to perform operations, this could include the hardware processor element performing the operations directly and/or facilitating, directing, or cooperating with one or more additional hardware devices or components (e.g., a co-processor and the like) to perform the operations.

The processor (e.g., hardware processor element 502) executing the computer-readable instructions relating to the above described method(s) can be perceived as a programmed processor or a specialized processor. As such, the module 505 for supporting management and resolution of alarms (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium may include a physical device, a hardware device, or a device that is discernible by the touch. More specifically, the computer-readable storage device or medium may include any physical devices that provide the ability to store information such as instructions and/or data to be accessed by a processor or a computing device such as a computer or an application server.

While various examples have been described above, it should be understood that they have been presented by way of example only, and not limitation. Thus, the breadth and scope of a preferred example should not be limited by any of the above-described examples, but should be defined only in accordance with the following claims and their equivalents.

What is claimed is:

1. A method comprising:
receiving, by a processing system including at least one processor, a set of alarm features of a first alarm;
generating, by the processing system based on the set of alarm features of the first alarm, an alarm fingerprint of the first alarm, wherein the generating of the alarm fingerprint of the first alarm comprises
(a) generating, by the processing system based on the set of alarm features of the first alarm, a set of hashes for the first alarm, wherein the set of hashes for the first alarm comprises, for each of the alarm features in the set of alarm features of the first alarm, a respective hash of the respective alarm feature, and
(b) generating, by the processing system based on the set of hashes for the first alarm, the alarm fingerprint of the first alarm, wherein the alarm fingerprint of the first alarm comprises a data structure including the set of hashes for the first alarm;
obtaining, by the processing system for a set of historical alarms, a set of historical alarm information comprising, for each of the historical alarms in the set of historical alarms, a respective alarm fingerprint of the historical alarm and a respective alarm resolution of the historical alarm;
determining, by the processing system based on the alarm fingerprint of the first alarm and the respective alarm fingerprints of the historical alarms, a set of similar historical alarms including one or more of the historical alarms, wherein the determining of the set of similar historical alarms comprises comparing the alarm fingerprint of the first alarm with the respective alarm fingerprints of the historical alarms, based on a similarity metric, to obtain a respective set of similarity values associated with the respective historical alarms;
determining, by the processing system based on one or more similarity values of respective one or more historical alarms in the set of similar historical alarms and respective one or more alarm resolutions of the respective one or more historical alarms in the set of similar historical alarms, an alarm resolution of the first alarm; and
initiating, by the processing system based on the alarm resolution of the first alarm, an alarm resolution action configured to resolve the first alarm.

2. The method of claim 1, wherein at least one of the alarm features of the set of alarm features of the first alarm is retrieved from the first alarm.

3. The method of claim 1, wherein at least one of the alarm features of the set of alarm features of the first alarm is determined based on an investigation of the first alarm.

4. The method of claim 1, wherein, for at least one of the alarm fingerprints of at least one of the historical alarms, the respective similarity value associated with the respective historical alarm is based on a distance between the alarm fingerprint of the first alarm and the respective alarm fingerprint of the respective historical alarm.

5. The method of claim 1, wherein the similarity metric comprises a distance-based metric.

6. The method of claim 5, wherein the distance-based metric comprises a jaccard similarity metric.

7. The method of claim 1, wherein the set of similar historical alarms is determined based on a similarity threshold associated with the similarity metric.

8. The method of claim 7, wherein the similarity threshold is based on an analysis of at least a portion of the historical alarms in the set of historical alarms.

9. The method of claim 1, wherein the determining of the set of similar historical alarms is based on, for at least one of the historical alarms, whether the alarm resolution of the respective historical alarm comprises an automated alarm resolution.

10. The method of claim 1, wherein the determining of the alarm resolution of the first alarm comprises:
    selecting, by the processing system from the set of similar historical alarms based on the respective one or more similarity values of the respective one or more historical alarms in the set of similar historical alarms and the respective one or more alarm resolutions of the respective one or more historical alarms in the set of similar historical alarms, one of the similar historical alarms; and
    determining, by the processing system based on the respective alarm resolution of the one of the similar historical alarms, the alarm resolution of the first alarm.

11. The method of claim 10, wherein the one of the similar historical alarms comprises, from ones of the similar historical alarms in the set of similar historical alarms for which the respective alarm resolution of the respective historical alarm comprises an automated alarm resolution, one of the historical alarms having a greatest similarity value.

12. The method of claim 1, wherein the alarm resolution action comprises at least one of: a blocking of an end device, a configuration of a network device, or a sending of a notification related to a device.

13. An apparatus comprising:
    a processing system including at least one processor; and
    a computer-readable medium storing instructions which, when executed by the processing system, cause the processing system to perform operations, the operations comprising:
        receiving a set of alarm features of a first alarm;
        generating, based on the set of alarm features of the first alarm, an alarm fingerprint of the first alarm, wherein the generating of the alarm fingerprint of the first alarm comprises
            (a) generating, based on the set of alarm features of the first alarm, a set of hashes for the first alarm, wherein the set of hashes for the first alarm comprises, for each of the alarm features in the set of alarm features of the first alarm, a respective hash of the respective alarm feature, and
            (b) generating, based on the set of hashes for the first alarm, the alarm fingerprint of the first alarm, wherein the alarm fingerprint of the first alarm comprises a data structure including the set of hashes for the first alarm;
        obtaining, for a set of historical alarms, a set of historical alarm information comprising, for each of the historical alarms in the set of historical alarms, a respective alarm fingerprint of the historical alarm and a respective alarm resolution of the historical alarm;
        determining, based on the alarm fingerprint of the first alarm and the respective alarm fingerprints of the historical alarms, a set of similar historical alarms including one or more of the historical alarms, wherein the determining of the set of similar historical alarms comprises comparing the alarm fingerprint of the first alarm with the respective alarm fingerprints of the historical alarms, based on a similarity metric, to obtain a respective set of similarity values associated with the respective historical alarms;
        determining, based on one or more similarity values of respective one or more historical alarms in the set of similar historical alarms and respective one or more alarm resolutions of the respective one or more historical alarms in the set of similar historical alarms, an alarm resolution of the first alarm; and
        initiating, based on the alarm resolution of the first alarm, an alarm resolution action configured to resolve the first alarm.

14. The apparatus of claim 13, wherein the alarm resolution action configured to resolve the first alarm comprises at least one of: a blocking of an end device, a configuration of a network device, or a sending of a notification related to a device.

15. A method comprising:
    receiving, by a processing system of a first communication network, a set of alarm features of a first alarm;
    determining, by the processing system based on the set of alarm features of the first alarm, an alarm fingerprint of the first alarm, wherein the determining of the alarm fingerprint of the first alarm comprises
        (a) generating, by the processing system based on the set of alarm features of the first alarm, a set of hashes for the first alarm, wherein the set of hashes for the first alarm comprises, for each of the alarm features in the set of alarm features of the first alarm, a respective hash of the respective alarm feature, and
        (b) generating, by the processing system based on the set of hashes for the first alarm, the alarm fingerprint of the first alarm, wherein the alarm fingerprint of the first alarm comprises a data structure including the set of hashes for the first alarm;
    encoding, by the processing system, the alarm fingerprint of the first alarm to form an encoded alarm fingerprint of the first alarm;
    sending, by the processing system toward a second communication network, a query including the encoded alarm fingerprint of the first alarm;
    receiving, by the processing system from the second communication network, a query response including a set of similar encoded alarm fingerprints associated with a respective set of alarms of the second communication network, wherein the similar encoded alarm fingerprints in the set of similar encoded alarm fingerprints are identified as being similar to the encoded alarm fingerprint of the first alarm based on a similarity metric configured to determine similarity between encoded data structures;

determining, by the processing system based on an analysis of the set of similar encoded alarm fingerprints, a management action related to the first alarm; and initiating, by the processing system, the management action related to the first alarm.

16. The method of claim 15, wherein the encoded alarm fingerprint of the first alarm and the similar encoded alarm fingerprints in the set of similar encoded alarm fingerprints are encoded based on respective bloom filters.

17. The method of claim 15, wherein the similarity metric comprises a tanimoto similarity metric.

18. The method of claim 15, wherein the analysis of the similar encoded alarm fingerprints in the set of similar encoded alarm fingerprints is configured to identify a trend associated with at least one type of alarm feature.

19. The method of claim 15, wherein the management action related to the first alarm comprises at least one of: a management action for the first communication network or a management action for the second communication network.

20. The method of claim 15, wherein the second communication network is operated by a communication network provider, wherein the first communication network is operated by a third party entity associated with the communication network provider.

* * * * *